Jan. 13, 1942.  H. KREIDEL  2,269,629
TUBE COUPLING
Filed June 10, 1939
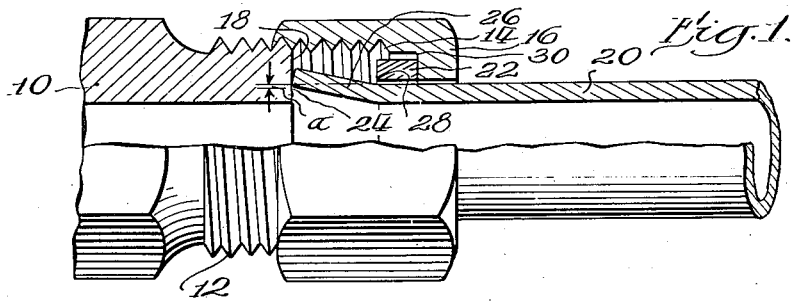
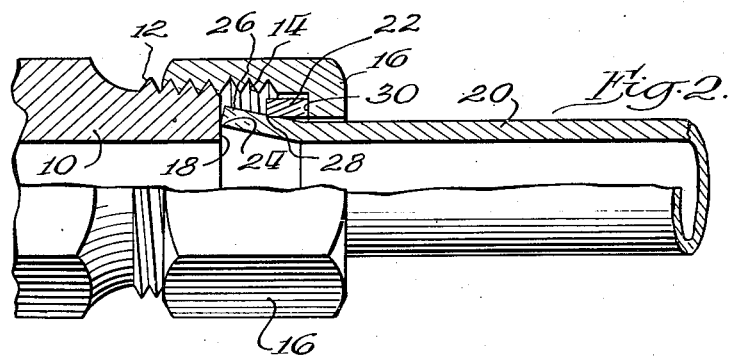
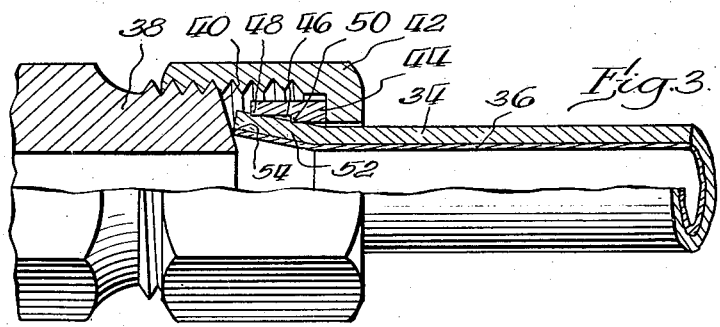
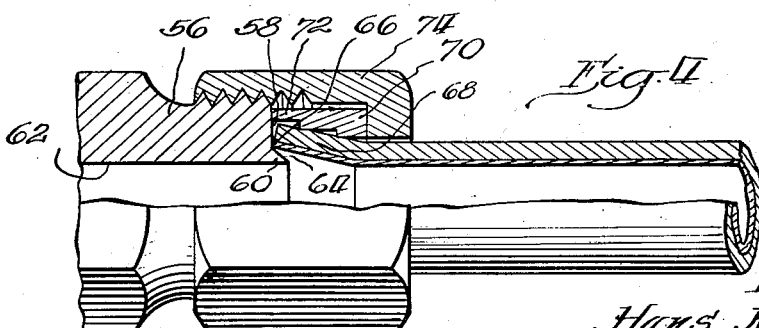
Inventor
Hans Kreidel
By Williams, Bradbury
McCaleb & Hinkle
Attys.

Patented Jan. 13, 1942

2,269,629

UNITED STATES PATENT OFFICE 2,269,629

TUBE COUPLING

Hans Kreidel, Wiesbaden, Germany

Application June 10, 1939, Serial No. 278,473
In Germany February 9, 1939

4 Claims. (Cl. 285—122)

My invention relates generally to tube couplings, and more particularly to improvements in tube couplings of the so-called flanged type.

It is an object of my invention to provide an improved form of tube coupling by which tubes and pipes may be readily connected to one another, and to various parts of machines and apparatus to obtain gas and liquid-tight joints therewith.

A further object is to provide an improved form of tube coupling, by means of which a line sealing contact between the end of the tube and the body of the coupling member is obtained.

A further object is to provide an improved tube coupling, in which means are provided to prevent undue deformation of the end of the tubing.

A further object is to provide an improved tube coupling which may be used satisfactorily for making connections with tubing having an internal coating or lining.

A further object is to provide an improved tube coupling which is simple in construction, may be used with facility, which is of low cost, and which is effective to maintain a seal under high pressure.

Other objects will appear from the following description, reference being had to the accompanying drawing, in which:

Figure 1 is a quarter sectional view of a coupling connection showing the parts in the positions they assume prior to complete assembly;

Figure 2 is a view similar to Figure 1, showing the parts in fully assembled condition;

Figures 3 and 4 are quarter sectional views of modified forms of the invention.

In the well known form of coupling, usually referred to as the flanged coupling, the end of the tube is expanded by a suitable flaring tool, and the expanded end of the tube is clamped between a seating surface formed on the coupling body and a complementary internal seating surface formed within the coupling sleeve. In such well known forms of couplings, the sealing contact is made throughout a relatively large area, with consequent relatively low unit pressures at the areas of contact. In accordance with my invention, the sealing contact between the tube and the body of the coupling is of very limited area, and may be considered to be substantially a line contact.

In the so-called flange type coupling, difficulty has been experienced when the surfaces of the flanged portion of the tubing are not perfectly smooth, or when the wall thickness of the tubing is not uniform. In such instances, the pressure contact between the tubing and its seat on the body of the coupling is non-uniform, and as a result a seal may be effected throughout only a portion of the periphery tube. For this reason, such flanged couplings have not proved entirely satisfactory, especially when it was endeavored to use them for making connections with tubing which was not sufficiently ductile to permit its conformation to the seating surface under the pressure applied by the clamping sleeve.

The coupling, as shown in Figs. 1 and 2, comprises a body 10 which is intended to be representative of a part of a T, union, or other pipe connection, or an integral part of any device or apparatus to which a tube is to be connected in fluid-tight relationship. The coupling body 10 has an external thread 12 formed thereon for cooperation with the internal thread 14 of a coupling sleeve 16. In the embodiment shown in Figs. 1 and 2, the body 10 has an end face 18 which is a smooth surface perpendicular to the axis of the body. The tube 20 may be of any suitable material, such as copper, brass, aluminum, or any ferrous alloy which is slightly ductile. The tube 20 is surrounded by a rigid, hard ring 22 which is rectangular in cross section, and which is of sufficiently great internal diameter to be freely slidable over the tube 20.

After assembling the sleeve 16 and ring 22 on the tube in the positions in which they are illustrated in Fig. 1, the end of the tube 20 is flared slightly, using a tapered mandrel or other suitable tool to expand the tube. The end of the tube having been formed by cutting in a plane perpendicular to the axis of the tube, the flaring will cause the end surface of the tube to assume a frusto-conical shape. This flaring of the tube end may be accomplished in any suitable manner, but the amount of the flaring should not be appreciably more than that illustrated in the drawing, in which it will be noted that the inner edge 24 of the end of the tube has a radius which is slightly less than the outer radius of the tube itself, as indicated by the dimension $a$. The extent of flaring of the tube end is thus considerably less than that customarily employed in the preparation of tubing for use with the so-called flanged couplings, and as a result the coupling herein described may be used with tubing made of metal of limited ductility. Even medium hard steel pipe or tubing of several milliameters wall thickness may be flared to the slight extent necessary for practicing the invention, without danger of cracking.

After the parts have been assembled and the tubing flared as indicated in Fig. 1, the coupling sleeve 16 is threaded over the body 10, thereby to press the gripping ring 22 against the tapering outer surface of the flared portion 26 of the tube. The ring 22 is sufficiently hard, strong and rigid that it will not be expanded to a measureable degree by its engagement with the tapered portion 26 of the pipe, and the forward inner edge 28 of the ring will grip the flared portion 26 in a manner to preclude the possibility of its acting as a drawing die.

As the ring 22 firmly engages the flared portion 26 of the tube, it is thereby held from rotation with the coupling sleeve 16, the relative movement taking place between the rearward end face of the gripping ring 22 and the complementary face 30 formed within the coupling sleeve 16. As the coupling sleeve 16 is tightened further on the body 10, the gripping ring 22 is advanced with respect to the tube 20 to the position in which it is shown in Fig. 2, firmly pressing the inner edge 24 of the end of the tube against the sealing surface 18 formed by the end face of the body 10. The force applied by screwing up the sleeve 16 is thus concentrated upon the limited area of contact between the edge 24 and the surface 18, being substantially what may be termed a line contact. By thus concentrating the clamping force over a very limited area of contact, the unit pressure of contact is very high, with the result that a seal capable of withstanding very high pressures is readily obtained. The lines of application of force between the ring 22 and the end face of the body 10 thus extend through the flared portion 26 of the tube substantially parallel to the axis thereof. Under certain circumstances, it may be desirable to utilize a soft metal or other gasket placed between the end face 18 of the body and the end of the tube, although ordinarily when the tubing and the body 10 are made of the usual materials, such gasket will be unnecessary. To facilitate handling of the sleeve 16 and ring 22, these parts may be preassembled so that they may be handled as a unit by any suitable method, such as by flanging one part into a recess formed in the other, by utilizing a temporary adhesive, or when the coupling is to be used with certain types of tubing, permanently securing the ring 22 in position within the coupling sleeve 16.

As previously indicated, the coupling is particularly adapted for use in making connections with lined tubing, such as illustrated in Fig. 3. The tube therein disclosed may comprise an outer wall 34 made of steel, wrought iron, or similar metal having an inner lining 36 of copper, aluminum, stainless steel, or the like, such tubing being customarily used for conducting liquids or gases which would have a corrosive effect upon the outer wall 34 of the tube. The inner coating or lining 36 may, of course, be in the form of a thin plating which is of sufficient thickness merely to protect the outer wall of the tube from the action of the fluid conducted therethrough. In such tubing, it is important that the end of the outer wall of the tubing shall not be exposed to the corrosive action of the fluid being conducted through the tube.

As illustrated in Fig. 3, the body 38, which is again representative of any suitable fitting, is of the same general construction as the body 10 except that its end face 40 is frusto-conical in shape. The sleeve 42 may be similar to the sleeve 16, while the gripping ring 44 is preferably made of greater width and is counter-bored as at 46 to provide a pair of gripping edges 48 and 50, which are arranged to engage the outer surface of the flared portion 52 of the tube. This type of gripping ring having the stepped internal bore which provides two gripping edges is preferably used in couplings for use with tubing made of relatively ductile metal, since the two gripping edges 48 and 50 serve to distribute the clamping force supplied by the sleeve 42, and thereby prevent appreciable deformation and scarification of the external surface of the flared portion of the tube which migh otherwise occur and tend to weaken the flared portion of the tubing.

In this construction shown in Fig. 3, the inner edge 54 of the tubing engages the conical surface 40 and thus assures that the seal will be made between the lining material 36 and the body 38. This is of importance, since when the tube is uesed to convey certain materials, an electrolytic corrosive action might take place between any exposed portion of the outer layer 34 of the tube and the inner coating or lining 36 thereof. It will be understood that the coupling body 38 will ordinarily be made of the same material as the lining 36 thereof, or of some other material which will not be affected by the substance conveyed through the tube, and which will not cause electrolytic corrosive action between the coupling body and the lining of the tube. It will be noted that in the construction of Fig. 3, as well as in the constructions shown in Figs. 1 and 2, the lines of force by which the flared end of the tube is clamped to the body extend substantially parallel to the axis of the tube, or from the edges of contact of the ring with the outer surface of the flared portion 26 of the tube, the lines of force converge slightly toward the axis of the tube. Thus, any tendency of the tube end portion to expand is counteracted, and the expanded end portion of the tube is constrained to maintain its original flared shape.

When the coupling is to be used with very soft ductile tubing, the construction shown in Fig. 4 is preferably utilized, this coupling comprising a body 56 having a radially extending end face 58 with a central projecting ridge 60 surrounding its bore 62. The outer surface 64 of the ridge 60 preferably provides a frusto-conical seat for engagement by the inner edge 66 of the end of the flared portion of the tube. In order to prevent excessive deformation of the end portion 68 of the tube by the ring 70, the latter is provided with an annular extension 72 which, when the coupling is completely assembled, abuts against the end face 58 of the body. Thus, further tightening of the coupling sleeve 74 upon the body 56 is prevented, and as a result the gripping internal edges of the ring 70 are prevented from undesired deformation of the outer surface of the tube. In this embodiment, as in those previously described, the ring tends not only to force the end portion 68 of the tube longitudinally against the body, but the forces applied by the ring also have inwardly directed radial components by which the inner edge 66 of the tube is firmly pressed against the seating surface 64.

From the foregoing description, it will appear that in each of the embodiments of the invention illustrated, the tube is secured to the body of the coupling by means of a gripping ring which encircles the slightly flared end of the tube and forces the latter into firm engagement with a seating surface formed on the body of the coupling in such manner that the sealing contact is provided between the inner circular edge of the extremity of the tube and the seating surface on the body, such contact being over such limited area as to be substantially a circular line contact.

As a result of the line contact between the tube and the coupling body, the unit pressure at the line of sealing is very high, with the concomitant advantage that the coupling connection will withstand high fluid pressure without leakage. Furthermore, due to the fact that the tubing need be flared at but a slight angle relative to the axis of the tube, and for a relatively short distance along the length of the tube, the coupling may be utilized for making joints with pipe and tubing of mild steel and similar metals of relatively slight ductility. It is by virtue of the fact that the point of sealing contact between the coupling body and the tubing is along the circular inner edge of the end of the tubing, that the coupling may be advantageously used with pipes and tubes of bi-metal construction, or in which the tube or pipe has a protective plating, coating or lining of metal or other material.

While I have shown and described preferred embodiments of my invention, it will be apparent to those skilled in the art that numerous variations and modifications thereof may be made without departing from the basic principles above set forth. For example, while I have described the inner diameter of the end of the tubing as being expanded to a dimension slightly less than the initial outer diameter of the tubing, it will be apparent that it may be expanded to a diameter substantially equal to, or even slightly greater than that of the initial outer diameter of the tubing, and yet accomplish many of the desired results herein set forth.

I therefore desire, by the following claims, to include within the scope of my invention all such varied and modified forms of my invention as will readily occur to those skilled in the art, and by which substantially the results of my invention may be obtained by substantially the same or equivalent means.

I claim:

1. A tube or pipe coupling for making a fluid-tight seal comprising a body having an end face, a tube of hard metal having a flared end portion such that its inner diameter at the extremity is not substantially greater and preferably slightly less than the normal outer diameter of the tube, the end surface of said tube being substantially frusto-conical to form a circular edge for substantially line contact with the end face of said body and rigid annular means cooperating with said body and having a relatively sharp inner edge engaging the outer surface of said flared portion of the tube to press the extremity of the tube perpendicularly against the end face of the body, thereby to form a fluid-tight seal between the extremity of said tube and the end face of said body.

2. The combination set forth in claim 1, wherein said means cooperating with said body for pressing the end of the tube against the end face of the body comprises a sleeve having threaded engagement with the body and having an internal shoulder, and a hard metal rigid ring having a sharp inner forward edge, said ring being engaged by said shoulder to be forced thereby perpendicularly against the outer surface of the flared portion of the tube, to cause said edge to dig into said outer flared surface of the tube, and to cause said circular edge of the end of said tube to be pressed firmly against the end face of said body and thereby effect a fluid-tight seal.

3. A tube coupling comprising a body having a bore formed therein and having an end surface formed by a central outwardly directed frusto-conical surface surrounding the bore and a substantially flat annular surface perpendicular to the bore and surrounding the frusto-conical surface, a hard metal tube having a slightly flared end portion presenting a substantially line contact edge, the maximum internal diameter of the flared portion of the tube being slightly less than the maximum diameter of the frusto-conical surface of said body, a rigid hard metal ring of inner diameter greater than the outer diameter of the unflared portion of said tube but of smaller diameter than the greatest outer diameter of the flared portion of said tube, and means for forcing said ring longitudinally against the flared portion of said tube, thereby to press the line contact edge of the extremity of the tube into sealing engagement with the end surface of said body.

4. The combination set forth in claim 3 in which the means for forcing the extremity of the flared portion of the tube into engagement with the end surface of the body includes an annular projection to limit the extent of movement of said ring toward said seating surface.

HANS KREIDEL.